No. 834,908. PATENTED NOV. 6, 1906.
P. L. HUSSEY.
TOOL FOR DETACHING AND RESETTING TIRES.
APPLICATION FILED NOV. 4, 1905.
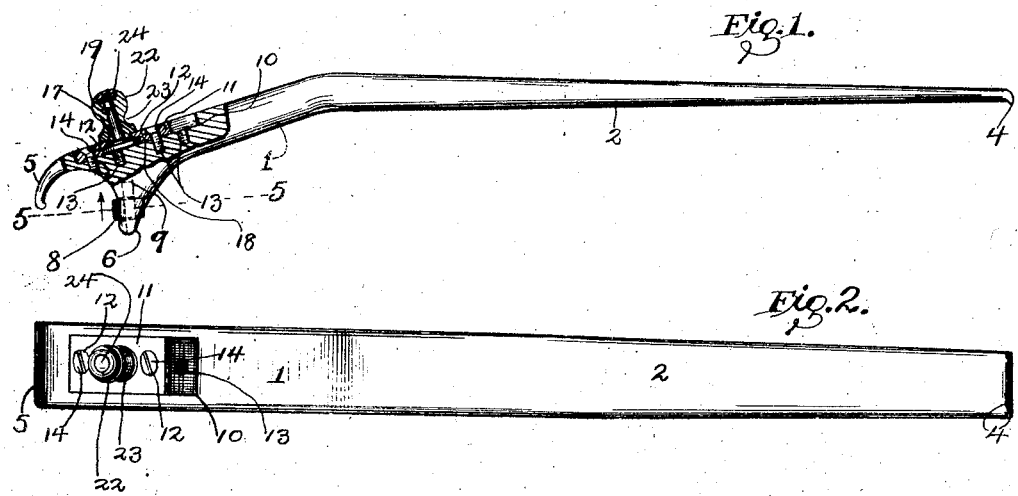
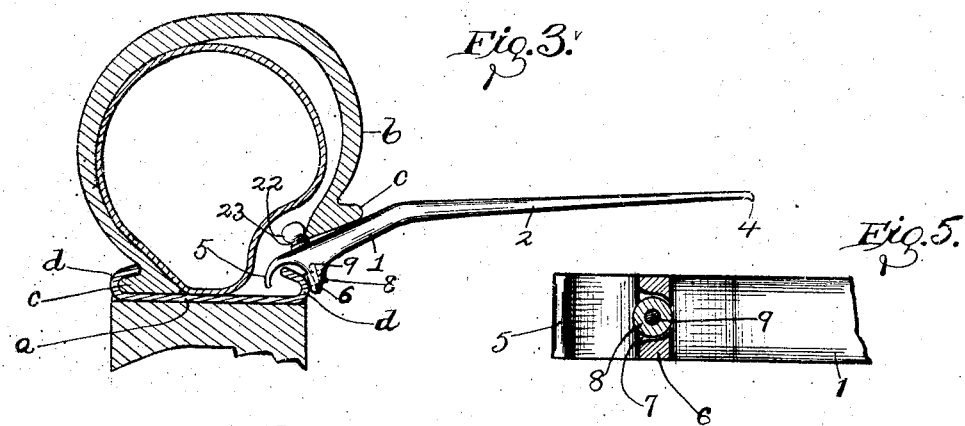
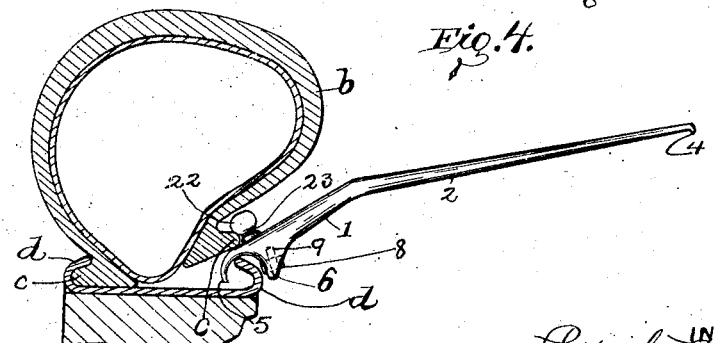
WITNESSES:
INVENTOR
Patrick L. Hussey
BY
Lynch & Dorer,
ATTORNEYS

UNITED STATES PATENT OFFICE.

PATRICK L. HUSSEY, OF CLEVELAND, OHIO.

TOOL FOR DETACHING AND RESETTING TIRES.

No. 834,908.      Specification of Letters Patent.      Patented Nov. 6, 1906.

Application filed November 4, 1905. Serial No. 285,866.

*To all whom it may concern:*

Be it known that I, PATRICK L. HUSSEY, a citizen of the United States of America, residing at Cleveland, in the county of Cuyahoga and State of Ohio, have invented certain new and useful Improvements in Tools for Detaching and Resetting Tires; and I hereby declare the following to be a full, clear, and exact description of the invention, such as will enable others skilled in the art to which it pertains to make and use the same.

This invention relates to a new and useful improvement in tools for detaching and resetting pneumatic tires.

The object of this invention is to provide a strong and compact tool of this description by means of which a tire can be readily detached or reset on the rim of a wheel without danger of injuring the tire.

My invention therefore consists in the features of construction and combination of parts as described in the specification, pointed out in the claims, and illustrated in the drawings.

In the accompanying drawings, Figure 1 is a side view of a tool embodying my invention with a portion thereof in section to show the adjustable feature. Fig. 2 is a top plan of same. Fig. 3 is a view showing a tire being detached by means of my tool. Fig. 4 is a view showing a tire being reset by means of my tool. Fig. 5 is a section on line 5 5, Fig. 1.

Again referring to the drawings, 1 represents the body portion of the tool, and 2 represents the handle portion, which is formed integral with the body portion and is tapered and flattened toward its end, whereon is formed a small beak 4. The forward end of the body portion 2 is flattened and curved down, forming a finger portion 5. On the bottom of the body portion is formed a lug or projection 6, and the said lug 6 and the finger 5 are arranged to straddle the inturned flange of the rim of the wheel, with the finger extending in over the edge of the flange and the projection 6 resting on the outer surface. In the face of the projection 6 is formed a pocket 7, and in the pocket 7 is arranged a roller 8, which is supported on a pin 9. A second projection is formed on the top of the body portion, and in order that this projection may be adjustable and also free to rotate it is arranged as follows: In the upper surface of the body portion 2 is formed a depression 10, in which is arranged a plate 11, having two screw-holes 12. The screw-holes 12 are arranged to register with two of a series of screw-holes 13, formed in the body portion 2, according as the plate is moved back or forward in the depression 10. When the plate is adjusted, it is secured in position by screws 14. In the plate 12 is formed a hole 17, and around said hole 17 on the under side of said plate 12 is formed a seat 18. Through the hole 17 in the plate 12 is passed a screw-threaded stud 19, and the head thereon is arranged to fit into the seat 18. On the stud 19 is mounted a cap or roller 22, which is preferably rounded at its outer end and has an annular groove 23 near its base. The roller 22 is secured on the stud by means of a nut 24. The object in having the projection on the upper surface of the tool adjustable is so that the tool can be adapted for use for different sizes of tires.

The operation of my tool when detaching and resetting a tire may be understood by reference to Figs. 3 and 4, wherein *a* represents a rim of the usual clencher pattern; *b*, the outer casing or shoe of the tire having the usual rib *c* at each side of its base, which is engaged by the inturned flange *d* of the rim, and *e* represents the inner tube. When the inner tube has been sufficiently deflated, the end of the handle of the tool is inserted between the base of the shoe and the rim of the wheel in order to pry the shoe away from the rim a sufficient distance to allow the body of the tool to be inserted between the base of the shoe and the rim, so that the finger 5 thereof will rest on the edge of the inturned flange and the projection 6 on the lower surface of the tool will extend over the outer surface of the flange, and the roller 8 will rest on said flange, and the projection on the upper surface of tool will support the base of the shoe, with the inner edge of the base of the shoe resting in the groove 23. The tool is then moved around the rim and readily detaches the tire from the rim. When it is desired to reset the tire, the tool is placed so that the finger rests on the inner edge of the inturned flange, and the projection on the bottom of the tool rests on the outer surface of the flange, while the projection on the upper surface of the tool engages the rib on the base of the shoe and presses it down and in, so that when the tool is moved around the rim the rib is forced into the rim. The roller on the upper surface of the tool prevents the tire from being worn by the operation of the tool and also lessens the friction so that the tool readily passes around the tire.

What I claim is—

1. In a tool of the character indicated, a body portion, a finger formed on the end of said body portion, a projection formed on the lower surface of said body portion, said finger and said projection being arranged to form a pair of jaws adapted to engage the rim of a wheel and a rotatable projection arranged on the upper surface of the tool in proximity to said jaws.

2. In a tool of the character indicated, a body portion, a finger formed on the end of the body portion, a projection formed on the lower surface of said body portion, said finger and said projection being arranged to form a pair of jaws adapted to engage the rim of a wheel, a stud arranged to project on the upper surface of said tool in proximity to said jaws and a roller arranged on the end of said stud.

3. In a tool of the character indicated, a body portion, a finger formed on the end of said body portion, a projection formed on the lower end of said tool, said finger and said projection being arranged to straddle the rim of a wheel, a depression formed in the upper surface of said tool in proximity to said finger, a plate arranged in said depression, means for adjustably securing said plate in said depression, a stud arranged on said plate and a roller mounted on said stud.

4. In a tool of the character indicated, a body portion, a finger arranged at the end of said body portion, a projection formed on the lower surface of said body portion, said finger and said projection being arranged to form a pair of jaws adapted to engage the rim of a wheel, a roller mounted on said projection and an adjustable projection arranged on the upper surface of the tool in proximity to said jaws.

5. In a tool of the character indicated, a body portion, a handle portion formed integral with the body portion, a downwardly curved finger formed at the end of the body portion, a projection formed on the lower surface of said body portion in proximity to said finger and provided with a flat side facing said finger and a roller mounted in said projection, substantially as described.

In testimony whereof I sign the foregoing specification in the presence of two witnesses.

PATRICK L. HUSSEY.

Witnesses:
DANIEL E. DALY,
ARTHUR H. ROYER.